United States Patent
Liao et al.

(10) Patent No.: US 11,898,028 B2
(45) Date of Patent: Feb. 13, 2024

(54) ACRYLIC RESIN EMULSION WITH HIGH HEAT RESISTANCE, POLYMERIC COMPOSITION THEREOF AND METHOD FOR PREPARING THE SAME

(71) Applicant: NAN YA PLASTICS CORPORATION, Taipei (TW)

(72) Inventors: Te-Chao Liao, Taipei (TW); Sen-Huang Hsu, Taipei (TW); Hui-Chun Chuang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 244 days.

(21) Appl. No.: 17/308,053

(22) Filed: May 5, 2021

(65) Prior Publication Data
US 2022/0017738 A1 Jan. 20, 2022

(30) Foreign Application Priority Data
Jul. 14, 2020 (TW) .................. 109123724

(51) Int. Cl.
| | | |
|---|---|---|
| *C08L 33/08* | (2006.01) | |
| *C08F 2/24* | (2006.01) | |
| *C08F 220/06* | (2006.01) | |
| *C08F 220/14* | (2006.01) | |
| *C08K 3/26* | (2006.01) | |
| *C08K 5/19* | (2006.01) | |
| *C08K 5/42* | (2006.01) | |
| *C08F 220/18* | (2006.01) | |
| *C08K 5/5415* | (2006.01) | |

(52) U.S. Cl.
CPC .............. *C08L 33/08* (2013.01); *C08F 2/24* (2013.01); *C08F 220/06* (2013.01); *C08F 220/14* (2013.01); *C08F 220/1804* (2020.02); *C08F 220/1811* (2020.02); *C08K 3/26* (2013.01); *C08K 5/19* (2013.01); *C08K 5/42* (2013.01); *C08K 5/5415* (2013.01); *C08K 2003/262* (2013.01); *C08L 2201/08* (2013.01); *C08L 2201/52* (2013.01)

(58) Field of Classification Search
CPC .. C08L 33/08; C08L 2201/08; C08L 2201/52; C08F 220/1804; C08F 220/1811; C08F 2/24; C08F 220/06; C08F 220/14; C08K 3/26; C08K 5/19; C08K 5/42; C08K 5/5415; C08K 2003/262
USPC ............................................ 524/556
See application file for complete search history.

(56) References Cited

U.S. PATENT DOCUMENTS
2016/0289516 A1* 10/2016 Makihata ................ B32B 27/06

FOREIGN PATENT DOCUMENTS
| CN | 103975261 A | * | 8/2014 | ............ C09J 133/14 |
| CN | 104334664 A | * | 2/2015 | ............ C08F 265/06 |
| TW | 201113343 A | | 4/2011 | |
| TW | 201819549 A | | 6/2018 | |

* cited by examiner

*Primary Examiner* — Kelechi C Egwim
(74) *Attorney, Agent, or Firm* — Li & Cai Intellectual Property Office

(57) ABSTRACT

An aqueous acrylic resin with high heat resistance, a polymeric composition, and a method for preparing the aqueous acrylic resin with high heat resistance are provided. The polymeric composition includes a monomer composition and a reactive emulsifier. Based on 100 wt % of the monomer composition, the monomer composition includes at least one alkyl group containing methyl acrylate, at least one carboxyl group containing methacrylic acid, an alkene-based unsaturated group containing methyl acrylate, a hydroxyl group containing acrylic polyester polyol and/or a hydroxyl group containing acrylic polyether polyol, and an alkoxysilane.

7 Claims, 2 Drawing Sheets

ACRYLIC RESIN EMULSION WITH HIGH HEAT RESISTANCE, POLYMERIC COMPOSITION THEREOF AND METHOD FOR PREPARING THE SAME

CROSS-REFERENCE TO RELATED PATENT APPLICATION

This application claims the benefit of priority to Taiwan Patent Application No. 109123724, filed on Jul. 14, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an aqueous acrylic resin, and more particularly to an aqueous acrylic resin with high heat resistance and a polymeric composition thereof, which belong to the technical field of the production and processing of artificial leathers.

BACKGROUND OF THE DISCLOSURE

Synthetic leather is formed from a cloth substrate having one or more layers of polyurethane (PU) or polyvinyl chloride (PVC) laminated thereon, and is an ideal replacement for real leather. Nowadays, synthetic leather products have been completely integrated into our daily lives. However, certain properties of the synthetic leather are inferior to those of the real leather. Thus, a treating agent is used to form a coating on a surface of the synthetic leather, so as to allow the synthetic leather to have properties that are similar to or better than those of the real leather.

Most treating agents used by both foreign and domestic synthetic leather manufacturers are solvent-based treating agents. Since the solvent-based treating agents contain toxic and harmful organic solvents such as toluene, a large quantity of volatile organic compounds (VOCs) is produced during the production or use of the synthetic leather, which are harmful to the environment and human health. In order to solve this problem, synthetic leather manufacturers have begun using water-based treating agents as a substitute for solvent-based treating agents. Although the water-based treating agents have been successfully used in the production of synthetic leather, the water-based treating agents are still not widely used due to its poor heat resistance.

SUMMARY OF THE DISCLOSURE

In response to the above-referenced technical inadequacies, the present disclosure provides an aqueous acrylic resin with high heat resistance and a polymeric composition thereof. A molecular structure of the aqueous acrylic resin contains a greater number of polar groups such as ester groups and alkoxy groups. Accordingly, a cohesive force and degree of crosslinking of the aqueous acrylic resin can be significantly increased, and the aqueous acrylic resin therefore has a higher heat resistance.

In one aspect, the present disclosure provides a polymeric composition for forming an aqueous acrylic resin with high heat resistance. The polymeric composition includes a monomer composition and a reactive emulsifier. The monomer composition, based on 100 wt % of the monomer composition, includes:

92 to 98 wt % of at least one alkyl group containing methyl acrylate;
1 to 4 wt % of at least one carboxyl group containing methacrylic acid;
1 to 5 wt % of an alkene-based unsaturated group containing methyl acrylate;
1 to 5 wt % of a hydroxyl group containing acrylic polyester polyol and/or a hydroxyl group containing acrylic polyether polyol; and
1 to 5 wt % of an alkoxysilane.

In one embodiment of the present disclosure, the at least one alkyl group containing methyl acrylate is selected from the group consisting of methyl methacrylate, ethyl acrylate, propyl methacrylate, butyl acrylate, isobutyl methacrylate, pentyl methacrylate, hexyl methacrylate, heptyl methacrylate, octyl methacrylate, 2-ethylhexyl methacrylate, n-octyl methacrylate, iso-octyl methacrylate, nonyl methacrylate, decyl methacrylate, lauryl methacrylate, octadecyl methacrylate, methoxyethyl methacrylate, n-butyl methacrylate, 2-ethylhexyl acrylate, and ethoxymethyl acrylate.

In one embodiment of the present disclosure, the at least one alkyl group containing methyl acrylate includes methyl methacrylate, n-butyl methacrylate, and butyl acrylate that are added in a weight ratio of 3:1:1.

In one embodiment of the present disclosure, the at least one carboxyl group containing methacrylic acid is selected from the group consisting of acrylic acid, methacrylic acid, maleic acid, fumaric acid, itaconic acid, butenoic acid, and maleic anhydride.

In one embodiment of the present disclosure, the at least one carboxyl group containing methacrylic acid includes acrylic acid and methacrylic acid that are added in a weight ratio of 1:1.

In one embodiment of the present disclosure, the alkene-based unsaturated group containing methyl acrylate is selected from the group consisting of vinyl acetate, styrene, methyl styrene, vinyl toluene, methacrylonitrile, diacetone acrylamide, N-hydroxymethyl acrylamide, cyclohexyl methacrylate, and isobornyl methacrylate.

In one embodiment of the present disclosure, the alkene-based unsaturated group containing methyl acrylate is isobornyl methacrylate.

In another aspect, the present disclosure provides an aqueous acrylic resin with high heat resistance that is formed by the polymeric composition including above-mentioned functional monomers.

In yet another aspect, the present disclosure provides a method for preparing an aqueous acrylic resin with high heat resistance. The method includes: forming an aqueous system in a reaction tank, the aqueous system including deionized water, a buffer, an emulsifier and an initiator; forming the polymeric composition including the above-mentioned functional monomers into a pre-emulsion, and adding a portion of the pre-emulsion to the aqueous system to carry out a reaction, so as to form a seeded emulsion; and adding the remaining portion of the pre-emulsion to the aqueous system to continue the reaction.

In one embodiment of the present disclosure, the buffer is sodium bicarbonate or ammonia water, the emulsifier is sodium dodecylbenzene sulfonate, and the initiator is sodium persulfate.

One of the beneficial effects of the present disclosure is that, the polymeric composition can be used to form an aqueous acrylic resin that has better heat resistance and alcohol resistance through the hydroxyl group containing acrylic polyester polyol and/or the hydroxyl group containing acrylic polyether polyol, the alkoxysilane, and the other functional monomers being bonded together via an emulsion polymerization reaction. Furthermore, the aqueous acrylic resin can be used in the production of artificial leathers, so as to reduce emission of volatile organic compounds (VOC), and to meet physical property requirements of the synthetic leathers.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
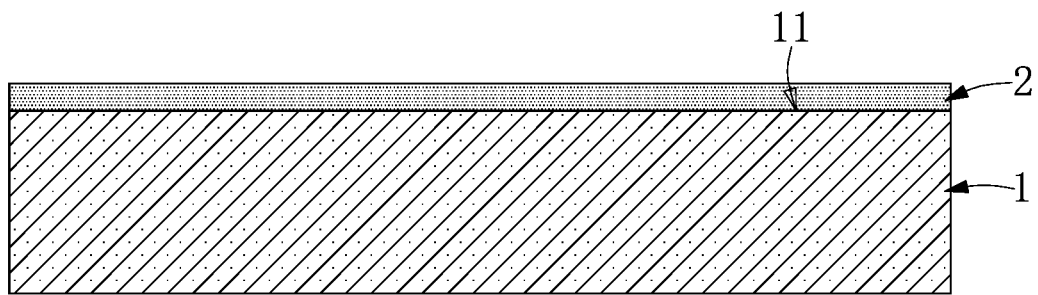
FIG. 1 is a schematic view showing one implementation of an aqueous acrylic resin with high heat resistance according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

As a substitution for real leathers, synthetic leathers have an extremely wide range of application. Therefore, the present disclosure provides a polymeric composition, which can be formed into an aqueous acrylic resin via an emulsion polymerization reaction, so as to increase the applicability of an aqueous treating agent for a surface treatment of the synthetic leathers. The polymeric composition includes a monomer composition and a reactive emulsifier. The monomer composition, based on 100 wt % of the monomer composition, includes:

92 to 98 wt % of at least one alkyl group containing methyl acrylate;

1 to 4 wt % of at least one carboxyl group containing methacrylic acid;

1 to 5 wt % of an alkene-based unsaturated group containing methyl acrylate;

1 to 5 wt % of a hydroxyl group containing acrylic polyester polyol and/or a hydroxyl group containing acrylic polyether polyol; and 1 to 5 wt % of an alkoxysilane.

Referring to FIG. 1, in practice, the aqueous treating agent that includes the aqueous acrylic resin formed of the polymeric composition of the present disclosure can form into a uniform coated layer 2 on a surface 11 of a synthetic leather 1 (such as a PVC synthetic leather or a PU synthetic leather). Accordingly, physical properties of the synthetic leather 1 can be improved, especially with respect to heat resistance and alcohol resistance. Furthermore, a recipe of the aqueous treating agent can be adjusted to allow the synthetic leather 1 to have a special appearance and texture. It is worth mentioning that when the aqueous acrylic resin is used in the production of the synthetic leather 1, emission of volatile organic compounds (VOC) is significantly reduced due to water being used as a dispersion medium, and requirements of environmental protection regulations can be satisfied. In addition, the aqueous acrylic resin with a higher heat resistance and alcohol resistance is better adapted for a production process of the synthetic leather 1.

More specifically, the emulsion polymerization reaction of the polymeric composition of the present disclosure can be carried out in an aqueous system, in which functional monomers and the reactive emulsifier can be bonded together to form the molecular structure of the aqueous acrylic resin. In certain embodiments, the aqueous system includes deionized water, a buffer, an emulsifier and an initiator. The buffer can be sodium bicarbonate or ammonia water, the emulsifier can be sodium dodecylbenzene sulfonate (SDBS), and the initiator can be sodium persulfate (SPS). However, such examples are not intended to limit the present disclosure.

In the polymeric composition, the at least one alkyl group containing methyl acrylate can be selected from the group consisting of methyl methacrylate, ethyl acrylate, propyl methacrylate, butyl acrylate, isobutyl methacrylate, pentyl methacrylate, hexyl methacrylate, heptyl methacrylate, octyl methacrylate, 2-ethylhexyl methacrylate, n-octyl methacrylate, iso-octyl methacrylate, nonyl methacrylate, decyl methacrylate, lauryl methacrylate, octadecyl methacrylate, methoxyethyl methacrylate, n-butyl methacrylate, 2-ethylhexyl acrylate, and ethoxymethyl acrylate. However, such examples are not intended to limit the present disclosure. The at least one alkyl group containing methyl acrylate can be used to adjust the molecular structure of the aqueous acrylic resin. Therefore, the aqueous acrylic resin can have an appropriate glass transition temperature (Tg), and is helpful for improving physical properties of the coated layer 2, such as hardness, gloss, fullness, weather resistance, and adhesion to a substrate.

The at least one carboxyl group containing methacrylic acid can be selected from the group consisting of acrylic acid, methacrylic acid, maleic acid, fumaric acid, itaconic acid, butenoic acid, and maleic anhydride. However, such examples are not intended to limit the present disclosure. The at least one carboxyl group containing methacrylic acid can provide carboxyl groups to the molecular structure of the aqueous acrylic resin, in which the carboxyl groups carrying negative charges can produce an adsorption effect with respect to substances carrying positive charges (such as positively charged inorganic particles). The carboxyl groups can also serve as bridging points for increasing intermolecular force, thereby increasing the mechanical strength of the coated layer 2. Furthermore, the at least one carboxyl group containing methacrylic acid can be used to increase the adhesion of the coated layer 2 with respect to the substrate.

The alkene-based unsaturated group containing methyl acrylate can be selected from the group consisting of vinyl acetate, styrene, methyl styrene, vinyl toluene, methacrylonitrile, diacetone acrylamide, N-hydroxymethyl acrylamide, cyclohexyl methacrylate, and isobornyl methacrylate. However, such examples are not intended to limit the present disclosure. The alkene-based unsaturated groups can be used to improve the physical properties of the coated layer 2, such as hardness, heat resistance, alcohol resistance, weather resistance, and adhesion to a substrate.

The hydroxyl group containing acrylic polyester polyol and/or the hydroxyl group containing acrylic polyether polyol can be selected from products of Dow Chemical Company, such as SPECFLEX™ NC 630, SPECFLEX™ NC 701, VORANAL™ 2070, VORANAL™ 3943A, VORANAL™ HL431, VORANAL™ HN395, VORANAL™ HF4001, VORANAL™ WH4043, and VORANAL™ CP6001. However, such examples are not intended to limit the present disclosure. The hydroxyl group containing acrylic polyester polyol and/or the hydroxyl group containing acrylic polyether polyol can be used to increase the adaptability of a coating (i.e., the aqueous treating agent) to different substrates, and to allow the coated layer 2 to have desired properties (such as flexibility, high hardness, high gloss, and high adhesion).

The alkoxysilane can be selected from products of Dow Chemical Company (such as XIAMETER™ OFS-6030 Silane, which is composed of γ-methacryloxypropyltrimethoxysilane), but the present disclosure is not limited thereto. The alkoxysilane can be used to provide alkoxy groups to the molecular structures of the aqueous acrylic resin, thereby improving the physical properties of the coated layer 2 (especially with respect to heat resistance and alcohol resistance).

The reactive emulsifier of the polymeric composition of the present disclosure can be selected from an emulsifier known as "SR-10" that is available from ADEKA Corporation, an emulsifier known as "PC-10" that is available from Sanyo Chemical Industries, Ltd, and emulsifiers known as "NOIGEN RN-20", "NOIGEN RN-30" and "NOIGEN RN-50" that are available from Chin Yee Chemical Industries Co., Ltd.

Figure 2:
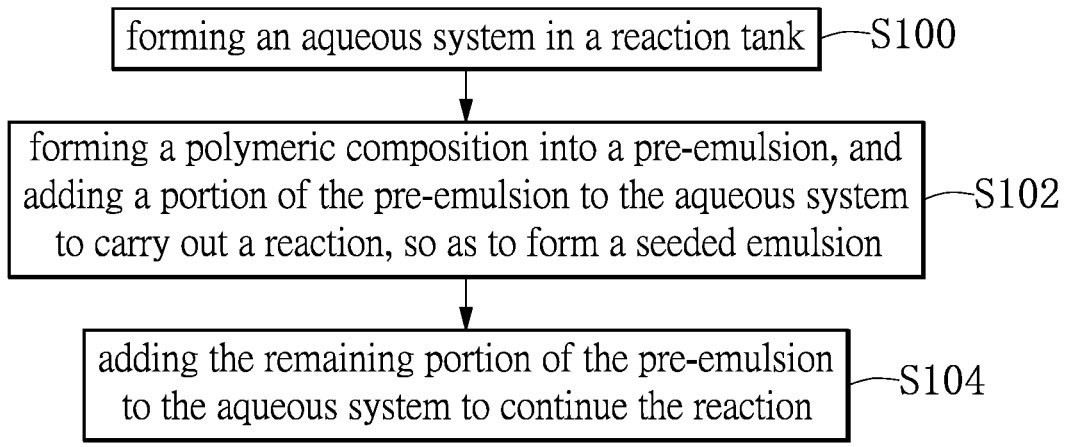
FIG. 2 is a flowchart of a method for preparing the aqueous acrylic resin with high heat resistance according to the present disclosure.

Referring to FIG. 2, the present disclosure further provides an aqueous acrylic resin with high heat resistance, which is formed of the polymeric composition including the above-mentioned functional monomers and the reactive emulsifier. The aqueous acrylic resin with high heat resistance of the present disclosure is prepared by the following steps. The first step (step S100) is to form an aqueous system in a reaction tank. The next step (step S102) is to form a polymeric composition into a pre-emulsion and add a portion of the pre-emulsion to the aqueous system to carry out a reaction, so as to form a seeded emulsion. The last step (step S104) is to add the remaining portion of the pre-emulsion to the aqueous system to continue the reaction.

In step S100, deionized water, a buffer, an emulsifier and an initiator are added in a certain ratio into a reaction tank and are well mixed by stirring, so as to form a mixture. Then, a temperature in the reaction tank is raised to a first temperature (e.g., 76-78° C.), and a metered quantity of a solution of the initiator is added to the mixture to be stirred for a period of time, so as to form the aqueous system. In step S102, the polymeric composition is mixed with an appropriate amount of deionized water to form a pre-emulsion. Then, a portion of the pre-emulsion is added in a certain amount to the aqueous system to carry out reaction over a period of time, so as to form a seeded emulsion. In step S104, a remaining portion of the pre-emulsion is added into the reaction tank under the first temperature, and a metered quantity of the solution of the initiator is then added into the reaction tank. After that, the temperature in the reaction tank is lowered to a second temperature (e.g., 40-42° C.), and the reaction continues for a period of time. The buffer is then added to adjust the pH of the resulting product. Subsequently, the temperature is lowered to room temperature.

Example 1

70 parts by weight of deionized water, 0.6 parts by weight of sodium bicarbonate, and 5 parts by weight of sodium dodecylbenzene sulfonate (SDBS) are added into the reaction tank and are well mixed by stirring. A temperature in the reaction tank is raised to 78° C., and a solution formed of 0.1 parts by weight of sodium persulfate (SPS) and 2 parts by weight of deionized water is added into the reaction tank. 35 parts by weight of deionized water, 1 part by weight of the reactive emulsifier with the name "SR-10", 57 parts by weight of methyl methacrylate (MMA), 19 parts by weight of n-butyl methacrylate (n-BMA), 18 parts by weight of butyl acrylate (BA), 1 part by weight of acrylic acid (AA), 1 part by weight of methacrylic acid (MAA), 2 parts by weight of isobornyl methacrylate (IBOMA), 1 part by weight of the polyol with the name "SPECFLEX™ NC 701", and 1 part by weight of the alkoxysilane with the name "XIAMETER™ OFS-6030" are well mixed by a stirrer to form a pre-emulsion. 14 parts by weight of the pre-emulsion is added into the reaction tank to carry out a reaction for over 30 minutes to form a seeded emulsion. The remaining pre-emulsion is added into the reaction tank in the form of drops, while the temperature is maintained at 78° C. After the reaction continues for 2 hours, a solution formed of 0.2 parts by weight of sodium persulfate (hydrophilic initiator) and 37.5 parts by weight of deionized water is added into the reaction tank in the form of drops, and a dropping time is controlled to be within 2 hours. After that, the temperature in the reaction tank is lowered to less than 40° C., and ammonia water is then added to adjust the pH of an obtained product to 7-8. Finally, the temperature is lowered to room temperature. The calculated solid content of the product is 42% by weight. The product is formed into a film, the properties of which are tested and shown in Table 1.

Example 2

The preparing process of Example 2 is the same as that of Example 1. The difference is that a monomer composition of a polymeric composition includes 57 parts by weight of methyl methacrylate (MMA), 19 parts by weight of n-butyl methacrylate (n-BMA), 18 parts by weight of butyl acrylate (BA), 1 part by weight of acrylic acid (AA), 1 part by weight of methacrylic acid (MAA), 2 parts by weight of isobornyl methacrylate (IBOMA), 1 part by weight of the polyol with the name "VORANAL™ HF4001", and 1 part by weight of the alkoxysilane with the name "XIAMETER™ OFS-6030". The calculated solid content of a product obtained by the preparing process is 42% by weight. The product is formed into a film, the properties of which are tested and shown in Table 1.

Example 3

The preparing process of Example 3 is the same as that of Example 1. The difference is that a monomer composition of a polymeric composition includes 57 parts by weight of methyl methacrylate (MMA), 19 parts by weight of n-butyl methacrylate (n-BMA), 18 parts by weight of butyl acrylate (BA), 1 part by weight of acrylic acid (AA), 1 part by weight of methacrylic acid (MAA), 2 parts by weight of isobornyl methacrylate (IBOMA), 0.5 parts by weight of the polyol with the name "SPECFLEX™ NC 701", 0.5 parts by weight of the polyol with the name "VORANAL™ HF4001", and 1 part by weight of the alkoxysilane with the name "XIAMETER™ OFS-6030". The calculated solid content of a product obtained by the preparing process is 42% by weight. The product is formed into a film, the properties of which are tested and shown in Table 1.

Comparative Example 1

The preparing process of Comparative Example 1 is the same as that of Example 1. The difference is that a monomer composition of a polymeric composition includes 57 parts by weight of methyl methacrylate (MMA), 19 parts by weight of n-butyl methacrylate (n-BMA), 18 parts by weight of butyl acrylate (BA), 1 part by weight of acrylic acid (AA), 1 part by weight of methacrylic acid (MAA), and 2 parts by weight of isobornyl methacrylate (IBOMA). Furthermore, the polymeric composition includes the reactive emulsifier with the name "PC-10". The calculated solid content of a product obtained by the preparing process is 42% by weight. The product is formed into a film, the properties of which are tested and shown in Table 1.

TABLE 1

| | Ingredients | | Example 1 | Example 2 | Example 3 | Comparative Example 1 |
|---|---|---|---|---|---|---|
| Initial reaction material | Deionized water | | 70 | 70 | 70 | 70 |
| | Sodium bicarbonate | | 0.6 | 0.6 | 0.6 | 0.6 |
| | SDBS (Anionic emulsifier) | | 5 | 5 | 5 | 5 |
| Hydrophilic initiator | Deionized water | | 2 | 2 | 2 | 2 |
| | SPS | | 0.1 | 0.1 | 0.1 | 0.1 |
| Polymeric composition | Deionized water | | 35 | 35 | 35 | 35 |
| | Reactive emulsifier | SR-10 | 1 | 1 | 1 | |
| | | PC-10 | | | | 1 |
| | Monomers (A) Alkyl group containing methyl acrylate | MMA | 57 | 57 | 57 | 59 |
| | | n-BMA | 19 | 19 | 19 | 19 |
| | | BA | 18 | 18 | 18 | 18 |
| | (B) Carboxyl group containing methacrylic acid | AA | 1 | 1 | 1 | 1 |
| | | MAA | 1 | 1 | 1 | 1 |
| | (C) Alkene-based unsaturated group containing methyl acrylate | IBOMA | 2 | 2 | 2 | 2 |
| | (D) Hydroxyl group containing acrylic polyester polyol and/or a hydroxyl group containing acrylic polyether polyol | SPECFLEX™ NC 701 | 1 | 1 | 0.5 | |
| | | VORANAL™ HF4001 | | | 0.5 | |
| | (E) Alkoxysilane | XIAMETER™ OFS-6030 | 1 | 1 | 1 | |
| Hydrophilic initiator | Deionized water | | 37.5 | 37.5 | 37.5 | 37.5 |
| | SPS | | 0.2 | 0.2 | 0.2 | 0.2 |
| Resin | Color appearance | | Milky white | Milky white | Milky white | Milky white |
| | Solid content (%) | | 42 | 42 | 42 | 42 |
| | Average particle (nm) | | 78 | 80 | 77 | 85 |
| Test results | Resistance to stickiness when heated (70° C./3 Kg/24 hours) | | No stickiness | No stickiness | No stickiness | Severe stickiness |
| | Resistance to abrasion under alcohol | | Normal | Normal | Normal | Flawed/scratched |

In Table 1, MMA refers to methyl methacrylate, n-BMA refers to n-butyl methacrylate, BA refers to butyl acrylate, AA refers to acrylic acid, MAA refers to methacrylic acid, and IBOMA refers to isobornyl methacrylate.

The resistance to stickiness when heated is tested by a method as described below. Firstly, a tested film is cut into two samples each having a size of 5 cm×5 cm. Subsequently, the two samples are attached to each other, and are pressed upon by an iron block of 3 kg for 24 hours in an oven at 70° C. After the two samples are taken out of said oven, whether or not there is a stickiness between the two samples is to be observed.

The resistance to abrasion under alcohol is tested by a method as described below. An electric friction decoloring machine is provided, which includes a clamp at a lower position and a friction head at a higher position. A sample of a tested film having a size of 9 cm×18 cm is fixed to the clamp. A white cotton cloth impregnated with 95% alcohol is fixed to the friction head, and is used to wipe the sample for ten times with a load of 1 kg. Afterwards, it is observed whether or not the sample is normal (i.e., whether or not the sample has scratches or flaws on the sample).

One of the beneficial effects of the present disclosure is that, the polymeric composition can be used to form an aqueous acrylic resin that has better heat resistance and alcohol resistance through the hydroxyl group containing acrylic polyester polyol and/or the hydroxyl group containing acrylic polyether polyol, the alkoxysilane, and the other functional monomers being bonded together via an emulsion polymerization reaction. Furthermore, the aqueous acrylic resin can be used in the production of artificial leathers, so as to reduce the emission of volatile organic compounds (VOC), and to meet the physical property requirements of the synthetic leathers.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A polymeric composition for forming an aqueous acrylic resin with high heat resistance, comprising a monomer composition and a reactive emulsifier, wherein based on 100 wt % of the monomer composition, the monomer composition includes:
    92 to 98 wt % of at least one first monomer, the first monomer being selected from the group consisting of methyl methacrylate, ethyl acrylate, propyl methacrylate, butyl acrylate, isobutyl methacrylate, pentyl methacrylate, hexyl methacrylate, heptyl methacrylate, octyl methacrylate, 2-ethylhexyl methacrylate, n-octyl methacrylate, iso-octyl methacrylate, nonyl methacrylate, decyl methacrylate, lauryl methacrylate, octadecyl methacrylate, methoxyethyl methacrylate, n-butyl methacrylate, 2-ethylhexyl acrylate, and ethoxymethyl acrylate;
    1 to 4 wt % of at least one second monomer, the second monomer being selected from the group consisting of acrylic acid, methacrylic acid, maleic acid, fumaric acid, itaconic acid, butenoic acid, and maleic anhydride;
    1 to 5 wt % of a third monomer, the third monomer being selected from the group consisting of vinyl acetate, styrene, methyl styrene, vinyl toluene, methacrylonitrile, diacetone acrylamide, N-hydroxymethyl acrylamide, cyclohexyl methacrylate, and isobornyl methacrylate;
    1 to 5 wt % of at least one of a hydroxyl group containing acrylic polyester polyol and a hydroxyl group containing acrylic polyether polyol; and
    1 to 5 wt % of an alkoxysilane.

2. The polymeric composition according to claim 1, wherein the at least one alkyl group containing methyl acrylate includes methyl methacrylate, n-butyl methacrylate, and butyl acrylate that are added in a weight ratio of 3:1:1.

3. The polymeric composition according to claim 1, wherein the at least one carboxyl group containing methacrylic acid includes acrylic acid and methacrylic acid that are added in a weight ratio of 1:1.

4. The polymeric composition according to claim 1, wherein the alkene-based unsaturated group containing methyl acrylate is isobornyl methacrylate.

5. An aqueous acrylic resin with high heat resistance formed by the polymeric composition as claimed in claim 1.

6. A method for preparing an aqueous acrylic resin with high heat resistance, comprising:
    forming an aqueous system in a reaction tank, the aqueous system including deionized water, a buffer, an emulsifier and an initiator;
    forming the polymeric composition as claimed in claim 1 into a pre-emulsion, and adding a portion of the pre-emulsion to the aqueous system to carry out a reaction, so as to form a seeded emulsion; and
    adding a remaining portion of the pre-emulsion to the aqueous system to continue the reaction.

7. The method according to claim 6, wherein the buffer is sodium bicarbonate or ammonia water, the emulsifier is sodium dodecylbenzene sulfonate, and the initiator is sodium persulfate.

* * * * *